United States Patent [19]

Wexler et al.

[11] 4,237,428
[45] Dec. 2, 1980

[54] 15.9 MICRON ACETYLENE LASER

[75] Inventors: Bernard L. Wexler, Arlington, Va.; Joseph A. Stregack, Silver Spring; Thomas J. Manuccia, Jr., Laurel, both of Md.

[73] Assignee: The United States of America as represented by the Secretary of the Navy, Washington, D.C.

[21] Appl. No.: 939,040

[22] Filed: Sep. 1, 1978

[51] Int. Cl.³ .......................... H01S 3/00; H01S 3/09
[52] U.S. Cl. .......................... 331/94.5 G; 331/94.5 P
[58] Field of Search ............... 331/94.5 G, 94.5 PE, 331/94.5 D, 94.5 P; 330/4.3

[56] References Cited

U.S. PATENT DOCUMENTS

| | | | |
|---|---|---|---|
| 3,891,944 | 6/1975 | Lavarini et al. | 331/94.5 G |
| 4,056,789 | 11/1977 | Stregack et al. | 331/94.5 G |
| 4,136,317 | 1/1979 | Stregack et al. | 331/94.5 G |

OTHER PUBLICATIONS

Stregack et al., "CW $CO-CS_2$, $CO-C_2H_2$, and $CO-N_2O$ Energy-Transfer Lasers*", *Applied Physics Letters*, vol. 28, No. 3, Feb. 1, 1976, pp. 137–139.

Peterson et al., "CW Chemical Lasers Pumped by Vibrational Energy Transfer: $CO/CO_2$ and $CO/N_2O$*", *J. of Applied Physics*, vol. 46, No. 10, Oct. 1975, pp. 4570–4572.

Stregack et al., "A New Electric Discharge Gas Dynamic Laser", *IEEE J. Quantum Electronics*, vol. QE-11, No. 8, Aug. 1975, p. 705.

*Primary Examiner*—James W. Davie
*Attorney, Agent, or Firm*—R. S. Sciascia; Philip Schneider; Melvin L. Crane

[57] ABSTRACT

A laser system in which acetylene is mixed with a gaseous mixture of helium and carbon monoxide which has been vibrationally excited significantly populating the lower vibrational levels of the CO. The carbon monoxide will transfer its energy to the acetylene, populating the upper (01000) level to create laser radiation near 15.9 microns which may be operated in continuous-wave or pulsed modes. The laser cavity includes mirrors which are highly reflective at 16 microns but transparent to radiation at 8 microns or other well-known means which will operate in the same fashion.

11 Claims, 4 Drawing Figures

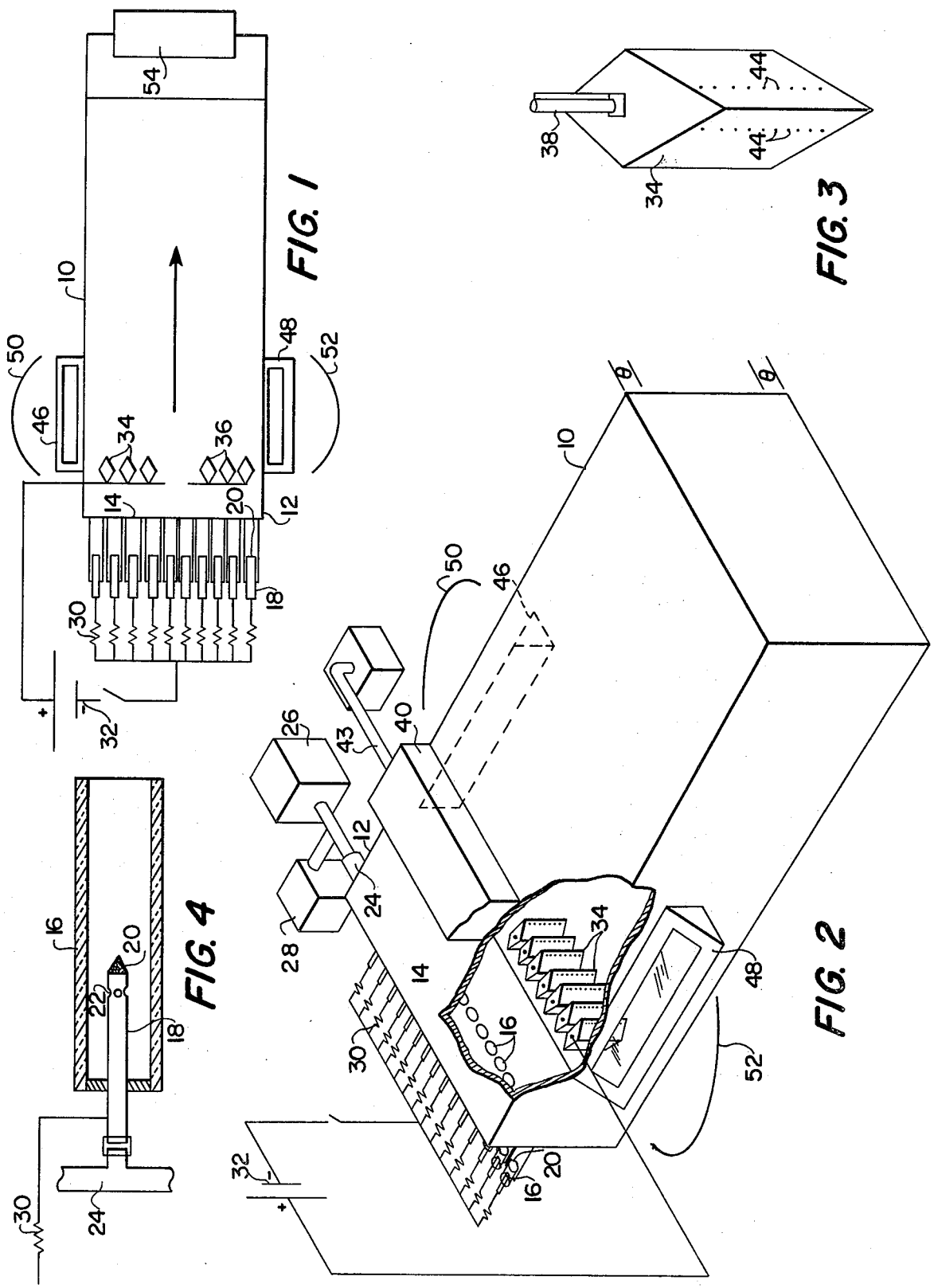

15.9 MICRON ACETYLENE LASER

BACKGROUND OF THE INVENTION

This invention relates to laser systems and more particularly to a $^{12}C_2H_2$ pulsed or continuous-wave laser system with an output near 15.9 microns.

Prior-art gas laser systems, in which the excitation energy discharge of some type, have used either premixed gases or gases mixed under sonic or subsonic conditions for laser operation. Previous systems of this type include those in which the lasing molecule receives its excitation energy directly from the electrical discharge and those in which some intermediate molecule, which has been excited by the discharge, transfers its energy to the lasing species. In the latter case, previously existing systems have been operated with gases already mixed in the discharge region, or with the lasing species mixed with the previously electrically excited intermediate gas under subsonic or sonic conditions. In those devices in which all gases existed simultaneously in the discharge, the presence of the lasing species may be deleterious to the efficient deposition of energy into the intermediate gas, or limit it in some way. Conversely, the system may suffer from the effects of the discharge on the lasing species present, as through dissocation. Sonic or subsonic mixing of the laser species into the excited intermediate gas may not occur on a time scale fast enough to achieve the population inversion in a system with a short vibration lifetime. Also, the rotational temperature of the gases may remain too high for optimal lasing conditions.

A laser system set forth in U.S. Pat. No. 4,056,789 includes the basic components for carrying out this invention. More especially, the nozzle section set forth in the patent is used in the structure of this invention.

SUMMARY OF THE INVENTION

The invention comprises an acetylene laser system operable at a wavelength near 15.9 microns using an infrared transition in acetylene $^{12}C_2H_2$. Helium and carbon monoxide are injected into a system in which the carbon monoxide will be vibrationally excited. Acetylene is injected into the excited gas while being supersonically expanded in the laser cavity region. The carbon monoxide is mixed with the acetylene gas in the cavity region where the carbon monoxide transfers its energy to the acetylene, populating the upper (01000) level. The optical cavity through which the gas mixture flows has a high loss (low Q) for 8 micron radiation, and a very low loss (high Q) for 16 micron radiation. Laser oscillation will therefore take place near 15.9 microns and not at 8 microns. The system may be operated in the continuous-wave (CW) or pulsed mode using a Q-switch arrangement. Laser radiation near 15.9 microns is useful for the separation of uranium isotopes.

BRIEF DESCRIPTION OF THE DRAWINGS

FIG. 1 is a schematic view illustrating the relative parts.

FIG. 2 is a side view in perspective which illustrates the relative parts.

FIG. 3 illustrates one nozzle of the nozzle section.

FIG. 4 illustrates one of the electrode-plenum tube arrangements.

DETAILED DECRIPTION

In carrying out this invention, a laser system is used in which helium and carbon monoxide are mixed together. The carbon monoxide is vibrationally excited and supersonically injected into an expansion-laser cavity-discharge chamber. As the vibrationally excited CO gas mixture is injected into the expansion area of the system acetylene gas is injected into the vibrationally excited gas mixture. A cavity region is set up downstream in the expansion chamber perpendicular to the axis of the chamber. The cavity is formed by mirrors or other well-known elements which are transparent to 8 $\mu$m wavelength but operative at about 16 $\mu$m. As the vibrationally excited gas mixture including $^{12}C_2H_2$ reaches the cavity region, the carbon monoxide will transfer its energy to the $^{12}C_2H_2$ populating the upper 01000 level. Therefore the laser system will operate on the (01000) $\Sigma_g^+$ to $(001^1 1^1)$ $\Sigma_u^+$ transition of the acetylene. As such, the laser system operates from a fundamental to combination level of a molecule. The 16 $\mu$m transition will be inverted in the system since the upper level is sufficiently populated for 8 $\mu$m laser oscillation and the lower level is unpopulated because of rapid collisional breakup of this level into the $\nu_5$ level is rapidly quenched. Thus the system may be operated either CW or pulsed.

In carrying out this operation a helium/carbon monoxide ratio may be 9.4/1. The pressure of the mixture in the discharge chamber may be 125 Torr. The flow rate of the vibrationally excited CO gas mixture is about 2.7 moles/sec of the gas or 17 grams/sec. The acetylene is injected into the vibrationally excited gas at a rate of 0.11 moles/sec or 2.9 grams/sec. The total gas flow rate in the cavity is 2.8 moles of mixture/sec or 19.9 grams/sec with a velocity of about $1.3 \times 10^5$ cm/sec.

A small amount of oxygen gas (about 0.3%) may be injected into the excitation area to improve the excitation of the CO.

The $^{12}C_2H_2$ 15.9 micron laser is easily scalable at the correct wavelength for uranium separation or for other uses. This is because deactivation of the upper state occurs more slowly with the 15.9 micron $^{12}C_2H_2$ system than that of a 16 micron $CO_2$ laser, so that higher densities of the laser gas may be used, and ultimately more energy extracted from the same volume. The 15.9 micron acetylene laser is intrinsically a CW device and will operate at high efficiency.

It has been determined that the acetylene laser system may be operated with acetylene isotopically substituted with $C^{13}$ or deuterium. However, different wavelengths will be obtained from the same transition. Further the 15.9 micron laser radiation from $^{12}C_2H_2$ may be produced in an intrinsically pulsed device such as an electron beam or electron beam/sustainer system.

Any suitable gas excitation, supersonic flow, gas expansion laser cavity operable at 16 $\mu$m may be used. As an illustrative system, a slightly modified system such as set forth in U.S. Pat. No. 4,056,789 may be used. Such a system is hereinafter described.

The system includes a housing 10 which includes a subsonic plenum section, a nozzle section and a supersonic flow region. The nozzle section is the same as the nozzle section set forth in U.S. Pat. No. 4,056,789 with the subsonic plenum section and the supersonic flow region being modified. The plenum section includes a gas volume excitation area 12 extending from the back side of the nozzle section to back wall 14 through which ten planar aligned glass plenum tubes 16 extend. A tubular electrode 18 which has a solid pointed end 20 extends into the outer end of each glass tube and is provided with one or more holes 22 in its wall near the tip through which a gas may flow. The end of each electrode is connected to a manifold 24 from which a mixture of an intermediate gas and a diluent gas is admitted into the plenum section through the electrodes, the gas mixture manifold is connected to a supply 26, 28 of each of the gases from which the gases are admitted into the manifold.

Each of the electrodes is connected, through a 100 K ohm ballast resistor 30, electrically in parallel to the negative side of a dc power supply 32. The ground side of the dc power supply is connected to the nozzles of the nozzle section. A radio-frequency discharge may be used instead of or in addition to the dc power supply. Since the power supply is connected to the electrodes, the gas manifold should be electrically insulated from the electrodes.

As described in U.S. Pat. No. 4,056,789, the nozzle section contains an array of a single row of uncontoured wedge-shaped nozzle elements 34 which are secured side-by-side across the width of the housing and so positioned relative to each other that adjacent nozzle elements form a throat 36 (see FIG. 1), the throat measuring 1.2 mm and the geometric area ratio of the expansion being 6. Each of the wedge-shaped nozzle elements is provided with a gas inlet line 38 (see FIG. 2) which extends upwardly through the upper wall of the housing, each of which connects with a plenum chamber 40 from which the acetylene gas is fed to each of the nozzles. The acetylene gas is fed from a supply source 42 under pressure to the plenum chamber through feed tube 43 in order to maintain a constant supply for the nozzle array. Each of the nozzles is provided with a plurality of linearly aligned holes 44 across its height, which holes are located 4 mm downstream from the throat formed by two adjacent nozzles. Each of the nozzles are connected to the positive side of the dc power supply to produce an electrical discharge between the ends of the nozzles and the tip of the electrode extending into each of the glass tubes.

The supersonic flow region begins at the outlet edge of the nozzle section and is the region in which the laser cavity is formed. For this purpose, the system is provided with oppositely disposed windows 46, 48 positioned in the same plane as the nozzle elements at Brewsters angle with respect to a line perpendicular to the axis of the housing and the direction of the gas flow. The windows may be positioned on any axis from 3 to 25 cm downstream from the nozzle exit plane. Axially translatable spherical mirrors 50, 52 are mounted opposite the windows to form the laser cavity. The mirrors are highly reflective at 16 microns but transparent to radiation of 8 microns. One mirror has maximum reflectivity whereas the other mirror is nominally a partially transmitting output mirror whose percent of transmittance gives the best output performance. The housing extends beyond the window and is connected with a suitable pump 24 shown in FIG. 1 for pumping the gases through the throats of the nozzle elements.

The supersonic cavity region housing beginning at the edge of the nozzle section has a small divergence of from about 1.0 degree to about 1.7 degrees of the upper and lower walls. This divergence expands the height of the cavity channel to allow for the increase in boundary layer occurring as a function of distance downstream from the nozzles. The divergence also allows more secondary gas to be injected without stalling of the supersonic flow which results in faster flow with lower temperatures in the cavity region.

In operation, a mixture of a helium gas and carbon monoxide gas is admitted to the subsonic plenum section through each of the electrodes. The mixture follows the glass tubes to the common gas volume excitation area near the nozzles. An electric discharge in the plenum section vibrationally excites the carbon monoxide gas, significantly populating the vibrational levels of this gas. The vibrationally excited carbon monoxide gas and helium gas mixture is then supersonically expanded through the nozzle array in which the supersonic expansion lowers both the pressure and the rotational temperature. Simultaneous with passage of the vibrationally excited gas through the nozzle array, the acetylene gas is injected into the gas flow about 4 mm downstream of the throat. The acetylene gas mixes with the vibrationally excited carbon monoxide and helium gas mixture and flows into the supersonic flow region where the vibrational energy of the carbon monoxide gas is transferred to the acetylene, populating the upper (01000) level. The mixing and energy transfer result in a population inversion between certain vibration-rotation levels of the acetylene gas, with subsequent laser oscillation occurring in the optical cavity whose axis is transverse to the gas flow axis in the supersonic flow region. Because the cavity is high-loss at 8 microns and low-loss at 16microns, the laser will operate on the (01000) $\Sigma_g{}^+$ to (0001$^1$1$^1$) $\Sigma_u{}^+$ transition of the acetylene molecule. Thus, the laser will operate from a fundamental to combination level of a molecule with operation near the 15.9 micron region. All of the gaseous mixture then flows through a diffuser and is exhausted by the high capacity pump. Multi-pass operation may also be used to extract more energy from the gas flow.

The acetylene gas input is removed a distance from the discharge region thereby maximizing the channeling of electrical energy into vibrational energy without encountering possible limitations imposed by the acetylene gas. Since the acetylene gas is injected into the "cold" supersonic flow region, the following advantages for different potential laser systems are incurred: promotion of anharmonic pumping of diatomic molecules, depopulation of lower laser levels near the ground state in polyatomic molecules, improvement of mixing at lower pressures, decreases of vibrational deactivation in the low-pressure supersonic flow, and increases of the gain by decreasing temperature.

In order to create the 15.9 micron radiation, the optical cavity through which the gas mixture flows is so arranged that it has a high loss (low Q) for 8 micron radiation and a very low loss (high Q) for 16 micron radiation. Laser oscillation will therefore take place at about 15.9 microns rather than at 8 microns. Use of a modified EDGDL means that problems associated with passing the acetylene through the discharge are avoided, CW or high pulse repetition rate operation is obtained and the translational and rotational temperature of the gas is low. At 200 K, the desired line is near the peak of the rotational distribution, so that it may be produced more efficiently.

In carrying out the invention, by use of the EDGDL shown, the EDGDL may be made of any suitable materials that will withstand the pressure and temperature of operation. In a preferred system, the nozzle housing, and supersonic cavity are of anodized aluminum with the channel of the cavity having the dimensions of ¾×10×12 inches. The tubes in the plenum are of 2 cm diameter glass and secured by flanges at each end with the downstream flange mating with the nozzle assembly. The electrodes in each of the glass tubes are of ¼ inch steel tubing with a stainless-steel tip soldered thereto. The electrode tips may be positioned a variable distance from the back edges of the nozzles with an optimum distance of 15 cm. Each electrode is ballasted with 100 k ohms, with a discharge voltage of about 8000 volts and a total current of 0.8 amps. The nozzles are made of copper and are wedge-shaped with the faces toward the plenum chamber of less length than the faces in the direction in which the laser gas is injected into the supersonic gas flow at a point 4 mm from the throat of the nozzles. The nozzle throat is 1.2 mm and the geometric area of the ratio of expansion is 6. The windows are placed at Brewster's angle and at a distance of up to 25 cm from the exit plane of the nozzle. The mirror cavity is formed with a maximum reflectivity dielectric mirror and a suitably transmitting output mirror. Also, the mirrors may be mounted on a moveable device so that the mirrors may be placed at different distances downstream from the exit plane of the nozzle array.

The electric discharge gasdynamic laser offers the advantage that electrical excitation can be used for a laser in which the lasing species would (a) either limit or inhibit the discharge in some way, (b) be dissociated in the discharge, or (c) would not itself be readily excited in the discharge, or would have significant lower laser level excitation in the discharge. Furthermore, the present system has the advantages of a system using supersonic expansion, so that the gases will be cooled and rapidly mixed in the region downstream of the nozzle.

The device has demonstrated that a carbon monoxide gas may be readily vibrationally excited in an electric discharge and that the energy can be stored in the vibrational mode of the gas until it can be supersonically expanded through a nozzle array and the acetylene mixed with it.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An acetylene laser operable at a wavelength near 15.9 microns which comprises:
    means for admitting a gaseous mixture including carbon monoxide into a plenum chamber;
    means for vibrationally exciting the carbon monoxide in said plenum chamber;
    means for pumping said vibrationally excited carbon monoxide gas mixture through a supersonic gas expansion section;
    means for adding acetylene gas to said vibrationally excited carbon monoxide gas mixture in said supersonic gas expansion section;
    oppositely disposed windows in said housing situtated downstream from said supersonic gas expansion section and positioned at Brewster's angle along said supersonic gas flow-laser cavity section;
    a fully reflective spherical mirror opposite one window and a partially reflective mirror opposite the other window both mirrors being transparent at 8 microns and highly reflective at 16 microns thereby forming an optical cavity axis transverse to the gas flow;
    said laser operating such that said vibrationally excited carbon monoxide will transfer its energy to said acetylene gas thereby operating on the (01000) $\Sigma_g^+$ to (0001$^1$1$^1$) $\Sigma_u^+$ transition of the acetylene molecule with an output near 15.9 microns.

2. An acetylene laser as claimed in claim 1 in which:
    helium is mixed with said carbon monoxide gas.

3. An acetylene laser as claimed in claim 2 wherein:
    the ratio of said helium gas to said carbon monoxide gas is about 9.4/1.

4. An acetylene laser as claimed in claim 1 in which:
    said plenum section includes a plurality of side-by-side glass tubes each of which open to a common area in which said gas mixture flows from said tubes.

5. An acetylene laser as claimed in claim 4 in which:
    said means for vibrationally exciting said carbon monoxide includes a tubular electrode with a solid point in each of said glass tubes with a voltage supply to said electrodes;
    each of said electrodes including at least one aperture therein for admitting a gas mixture into each of said glass tubes.

6. An acetylene laser as claimed in claim 4 in which:
    said supersonic gas flow-laser cavity section includes a small divergence between the upper and lower walls in order to expand the height of said section.

7. A method of operating an acelylene laser at about 16 μm comprising:
    forming a laser cavity operative at about 16 μm with its axis perpendicular to the axis of a supersonic flow region;
    vibrationally exciting a HeCO gas mixture to vibrationally excite the CO in the gas mixture;
    supersonically accelerating said vibrationally excited gas mixture through said supersonic flow region and through a laser cavity;
    injecting $^{12}C_2H_2$ into said vibrationally excited gas mixture prior to passage through said laser cavity in order to transfer the vibrational energy of the gas mixture to the $^{12}C_2H_2$ thereby populating the upper 01000 level with lasing at about 16 μm.

8. A method of operating an acetylene laser at about 16 μm comprising the steps of:
    forming a laser cavity having a high loss (low Q) for 8 micron radiation, and a very low loss (high Q) for 16 micron radiation relative to a laser chamber,
    vibrationally exciting a CO gaseous mixture to vibrationally excite the CO in the gaseous mixture; thereby populating the vibrational levels of the CO,
    injecting an acetylene gas into the vibrationally excited CO gaseous mixture thereby vibrationally exciting the upper state of the acetylene by collision with the vibrationally excited CO to transfer the vibrational energy of the CO gas to the acetylene thereby populating the upper (01000) energy level with an inversion between the (01000) $\Sigma_g^+$ to (0001$^1$1$^1$) $\Sigma_u^+$ transition of the acetylene molecule with an output at 15.9 μm.

9. A laser system operable at a wavelength near 15.9 microns which comprises:
    a plenum chamber,
    means for admitting a gaseous mixture into said plenum chamber;

said plenum chamber including a plurality of side-by-side glass tubes each of which open to a common area in which said gaseous mixture flows from said glass tubes;

means for vibrationally exciting one of the gases of said gaseous mixture in said plenum chamber;

a supersonic gas expansion section;

means for pumping said vibrationally excited gas mixture through said supersonic gas expansion section;

means for adding a lasing gas to said vibrationally excited gas mixture in said supersonic gas expansion section;

said supersonic gas flow-laser cavity section in axial alignment with said supersonic gas expansion section;

oppositely disposed windows situated downstream from said supersonic gas expansion section and positioned at Brewster's angle along said supersonic gas flow-laser cavity section;

said supersonic gas flow-laser cavity section including a high loss (low Q) for 8 micron ratiation and a very low loss (high Q) for 16 micron radiation operative relative to said windows for 15.9 micron operation.

10. An acetylene laser as claimed in claim 9 in which:

said means for vibrationally exciting said carbon monoxide includes a tubular electrode with a solid point in each of said glass tubes with a voltage supply to said electrodes;

each of said electrodes including at least one aperture therein for admitting a gas mixture into each of said glass tubes.

11. An acetylene laser as claimed in claim 10 in which:

said supersonic gas flow-laser cavity section includes a small divergence between the upper and lower walls in order to expand the height of said section and to improve the gas flow.

* * * * *